(No Model.)

J. T. WALKER.
PHOTOGRAPHIC CAMERA.

No. 467,454. Patented Jan. 19, 1892.

Witnesses:
E. P. Ellis,
B. Brockett.

Inventor:
Jas. T. Walker,
per
Lehmann & Pattison,
Att'ys

UNITED STATES PATENT OFFICE.

JAMES T. WALKER, OF PALMYRA, NEW YORK.

PHOTOGRAPHIC CAMERA.

SPECIFICATION forming part of Letters Patent No. 467,454, dated January 19, 1892.

Application filed October 17, 1890. Serial No. 368,396. (No model.)

*To all whom it may concern:*

Be it known that I, JAMES T. WALKER, of Palmyra, in the county of Wayne and State of New York, have invented certain new and useful Improvements in Photographic Cameras; and I do hereby declare the following to be a full, clear, and exact description of the invention, such as will enable others skilled in the art to which it pertains to make and use it, reference being had to the accompanying drawings, which form part of this specification.

My invention relates to an improvement in photographic cameras; and it consists in the construction and arrangement of parts, which will be fully described hereinafter.

The object of my invention is to produce a camera which is provided with several apartments and a revolving disk carrying a lens, which can be made to register with each apartment, and a spring-actuated shutter upon the said disk for opening and closing the aperture in which the lens is placed, thereby exposing the plate, and which construction enables several pictures to be taken upon a single negative-plate or upon several plates, which are placed in each apartment, without removing the negative or negatives from the camera.

Figure 1:
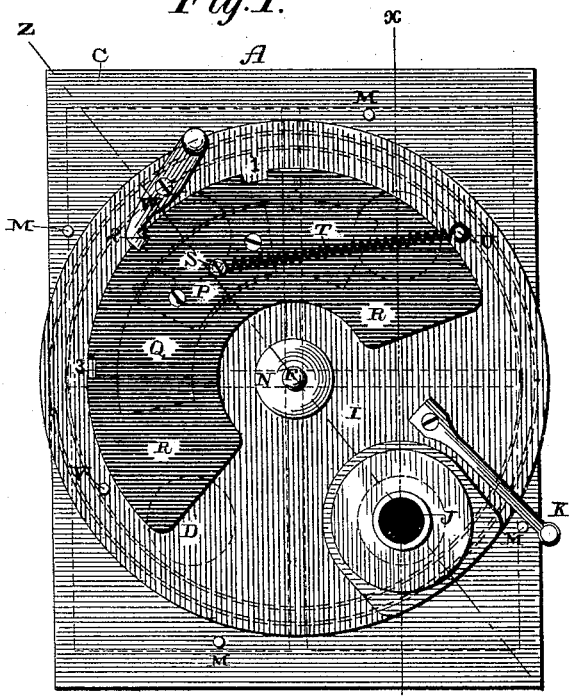
Figure 2:
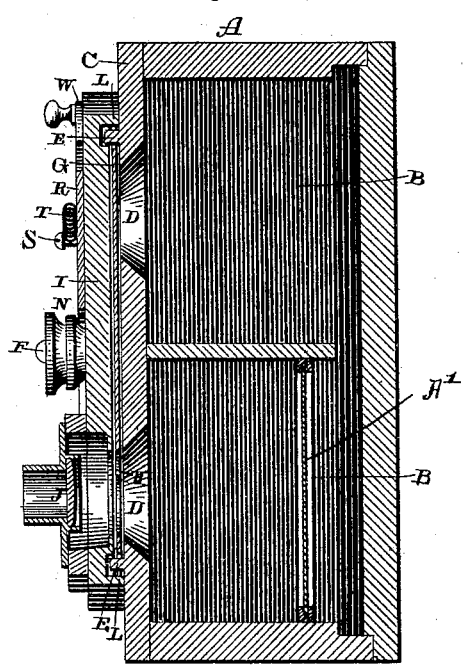
Figure 3:
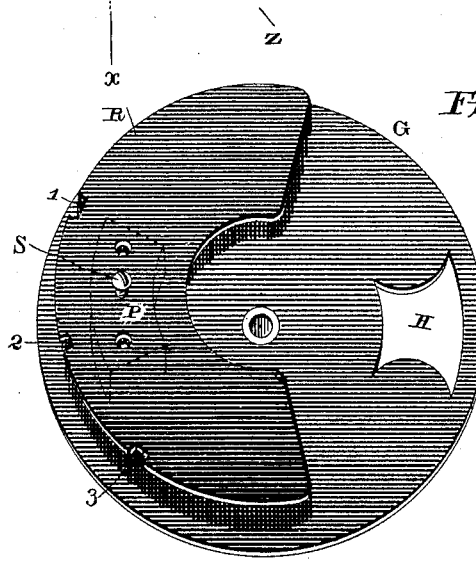
Figure 4:
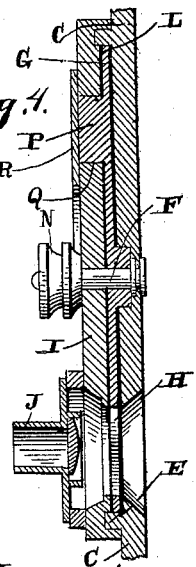

Figure 1 is a front elevation of a camera which embodies my invention, the apartments and the openings thereto being shown in dotted lines. Fig. 2 is a vertical section taken on the dotted line *x x* of Fig. 1. Fig. 3 is a detached view of the circular shutter and the segmental plate which is secured thereto. Fig. 4 is a section through the disk I and the shutter connected thereto, taken on the dotted line *z z* of Fig. 1.

A represents the box of a camera, which is here shown as divided into four apartments B, but which may be divided into any other number of apartments, as preferred. Formed in the face C of the box are the openings D, which allow light to pass into the apartments B. Extending outward from the face C of the box is a circular flange E, which surrounds the openings D, and a screw-threaded projection F at the center of the said circular flange. Placed upon this projection F is a circular shutter G, which is provided with an exposing-opening H. Also journaled upon this projection F is a disk I, which is provided with a lens J, which is placed within the radii of a circle drawn through the openings D, so that the lens will register with the openings D as the said disk is revolved by means of a spring-handle K, which is secured thereto and projects outward beyond the edge thereof, as shown. Extending inward from the disk I is a flange L, which incloses the flange E upon the face C of the box, as shown in Fig. 2. Extending outward from the face C of the box A are the projections M, which are placed in such relation to the openings D that as the disk I is revolved the handle K engages the said projections when the lens J is covering the opening D, which is adjacent to the projection that is engaged by the handle K.

When it is desired to move the disk I, the handle K being made of spring metal, it is pulled outward until it will pass over the projection M, which it engages, when the disk can be revolved until the handle engages the next projection, when the lens will be over the adjacent opening D to the projection engaged by the handle. For the purpose of causing the disk I to have sufficient friction against the face C of the box, the two nuts N are placed upon the screw-threaded projection F, and by means of which the said disk I is made to bear against the face C of the box. By providing the face of the box and the adjacent face of the disk I with circular flanges all light, dirt, or dust is prevented from passing through the openings D into the box A.

Placed within the space formed between the flange E upon the face of the box and the disk I is a circular shutter G, as before described, which is provided with an opening H and a projection P, which extends through a circular opening Q, made in the disk I. Secured to the projection P upon the shutter G, outside of the disk I, is a segmental plate R, which closes the opening Q, in which the projection P moves, and serves as a means for revolving the shutter, as will hereinafter be described. Secured to the segmental plate R, preferably at its center, is a projection S, to which one end of a spring T is secured, the opposite end of the said spring being secured either to the projection U or the projection V, which extends from the face of the disk I outside of the said plate R. Pivoted to the outer face of the disk I is a latch W, which has one end provided with a handle and its opposite end with a hook that engages the recesses 1 2 3, which are made in the outer edge of the segmental plate R.

When the negative plate or plates have been placed within the box A and the handle K is made to engage one of the projections M, the lens J covers the adjacent opening D. Then by turning the segmental plate R so that the latch W engages the recess 1 thereof the opening to the lens is closed. The spring T having its outer end passed over the projection U, by depressing the latch W the plate R is released and the shutter made to revolve toward the projection U, which opens the opening to the lens and exposes the plate in the apartment over which the lens is placed and immediately closes it again. Then, by causing the latch W to engage the recess 3, detaching the outer end of the spring T from the projection U and placing it over the projection V, and turning the plate I around so that the lens will register with the next opening D, and depressing the latch W, the spring T revolves the shutter G in the opposite direction, which exposes the plate through that apartment over which the lens is then placed. This operation is then repeated until each opening to the several apartments has been exposed to the light.

It is designed to use with this camera what is known as a "universal lens;" but, if preferred, a focusing-lens may be used. When it is desired to hold the shutter so that the opening H of the shutter will register with the lens, the latch W is made to engage with the recess 2 of the segmental plate R. By means of this construction very sharp pictures can be obtained that otherwise could not—as, for instance, all animals or subjects which are constantly changing position. During the time of changing a ground-glass or focus screen and getting the plate-holder into position the subject moves and gets out of focus. In my construction, however, a ground glass A' is in the apartment adjacent to one with sensitive plate, and as soon as a focus is secured a single movement of the disk I changes the position of the lens before the sensitive plate and an exposure is at once made.

Having thus described my invention, I claim—

1. In a camera, the combination of the box having several apartments and openings thereto, a revolving disk carrying a lens which registers with the openings, a revolving shutter between the lens and the box, and a reversible spring whereby the shutter is made to revolve in opposite directions, for the purpose shown and described.

2. In a camera, the combination of the box having several apartments, openings thereto, a revolving disk provided with a lens and having a circular opening, a revolving shutter between the disk and the box, and a segmental plate placed over the said circular opening in the disk and secured to the shutter, substantially as specified.

3. In a camera, a box provided with two or more apartments, openings thereto, a revolving disk provided with a lens which registers with the said openings, and a shutter upon the said disk, combined to operate substantially as specified.

4. In a camera, a box provided with two or more apartments, openings thereto, a revolving disk provided with a lens, and a revolving or oscillating shutter upon and carried by the said disk, substantially as described.

5. In a camera, a box having an apartment, an opening thereto, a revolving disk having a lens which registers with the said opening, and a shutter connected with the said disk, having an opening, whereby a movement of the shutter will open and close the opening, combined to operate substantially as shown.

In testimony whereof I affix my signature in presence of two witnesses.

JAMES T. WALKER.

Witnesses:
CARLTON C. M. HUNT,
C. B. WHITMAN.